Dec. 9, 1958   R. H. BERGERSON   2,863,372
TRACTOR SAFETY HITCHES
Filed Aug. 12, 1955

INVENTOR.
Raymond H. Bergerson
BY
Morrill & Morrill
ATTORNEYS.

United States Patent Office 2,863,372
Patented Dec. 9, 1958

2,863,372

TRACTOR SAFETY HITCHES

Raymond H. Bergerson, Northfield, Wis.

Application August 12, 1955, Serial No. 528,065

3 Claims. (Cl. 97—47.89)

This invention relates generally to a tractor safety hitch that is actuated when an obstruction is encountered by the tillage tool.

One of the hazards of the tillage operation is that an unexpected obstruction, such as a hidden rock or tree stump, may be struck by the tillage tool. The unexpected shock may cause the tool, such as a plow, or the tool beam to break, and in some cases may injure the tractor operator as he is catapulted forward.

It is an object of the present invention to provide a new and useful improvement in a tractor having a mounted tillage tool that will prevent or lessen the danger usually present when the tillage tool encounters an obstruction.

Another object of the present invention is to provide a tractor hitch linkage wherein the tillage tool will be swung out of the ground when an obstruction is encountered.

A further object of the present invention is to provide a tractor hitch linkage wherein a skid element is swung down to engage the ground as said tillage tool is swung up when an obstruction is encountered.

Other objects will be apparent from the following description when read in connection with the drawings, in which.

Figure 1:
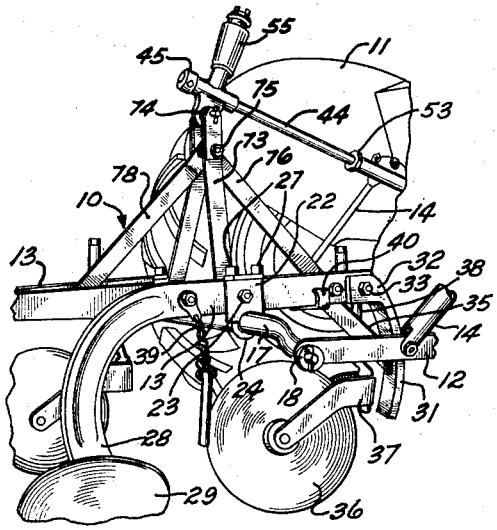
Fig. 1 is a fragmentary perspective view at the rear of a tractor showing the hitch linkage in normal soil tillage operating position.
Figure 2:
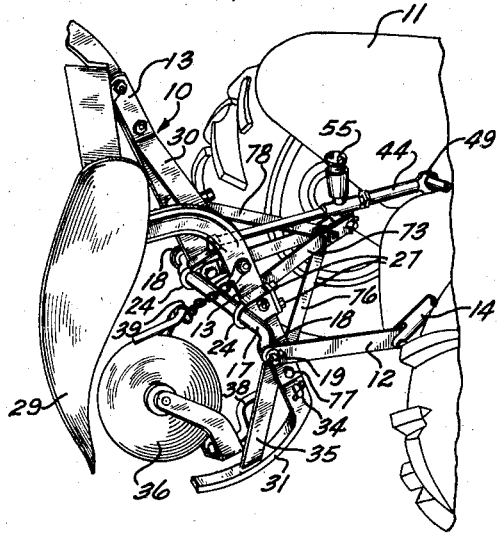
Fig. 2 is a perspective view similar to Fig. 1 showing the tractor hitch linkage with the tillage tool swung out of the ground such as occurs after an obstruction is encountered.
Figures 3, 4, 5, 6:
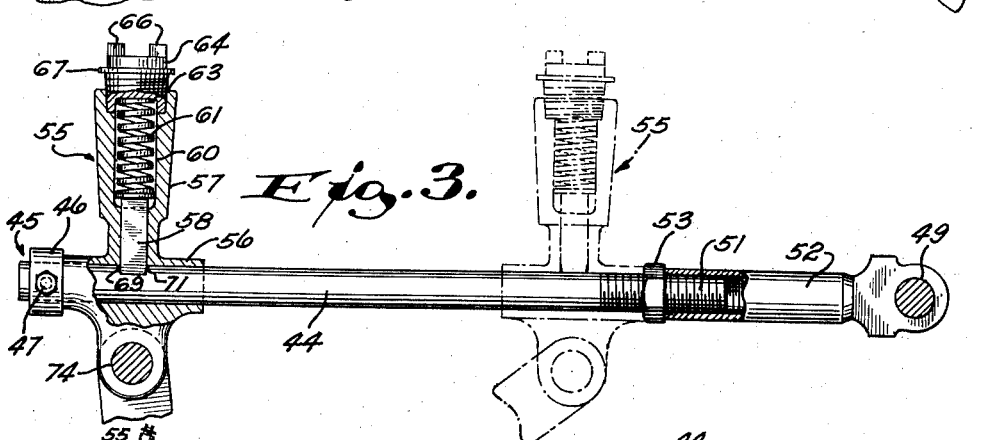
Fig. 3 is a side view, partly in section, of the upper releasable link of the tractor hitch linkage.
Fig. 4 is a schematic side elevational representation of the tractor and hitch linkage in normal operating position just prior to encountering an obstruction in the ground.
Fig. 5 is a view similar to Fig. 4 showing the relationship of the tractor and hitch linkage after an obstruction has been encountered and after the tillage tool has been swung out of the ground.
Fig. 6 is a similar view showing the application of the present invention to a cultivating type of tillage tool.

Referring to the drawings by characters of reference, Fig. 1 illustrates a hitch linkage 10 mounted on a tractor 11. Linkage 10 is generally constructed along the lines of a three-point "Ferguson" hitch which is well known to those skilled in the art. This linkage includes lower draft transmitting elements 12 and 13 extending rearwardly from tractor 11. Elements 12 comprise a pair of spaced draft links (only one of which can be seen in Figs. 1 and 2) attached to tractor 11 at pivot mountings 15, as shown in Figs. 4 and 5. Lift links 14 are connected to draft links 12 and can be operated by a hydraulic lifting mechanism (not shown) to raise, lower or hold linkage 10 in a selected position.

Elements 13 comprise tool frames that are fastened at a midpoint to transverse crank axle 17 which in turn is pivotally mounted at the rearward ends 18 of draft links 12. Pins 19 passed through the transverse ends of axle 17 maintain the pivotal connection between axle 17 and draft links 12.

Each side of the tool frames 13 is fastened to a bracket 22 with a nut and bolt connection 23. Bracket 22 includes a U-shaped bolt 24 that passes around axle 17 and can be fastened with bolts 27. In this manner pivotal movement of tool frame 13 is provided around axle 17.

At the rearward ends of tool frame 13 section 28 is curved downwardly to provide a mounting for tillage tool 29. It will be noted in Figs. 1 and 2 that parts of two tillage tool assemblies are shown. However, the present invention is adaptable for use with either one or a plurality of tillage tools. In Figs. 1 and 2 a plurality of tillage tools assemblies are partially shown, such as the one illustrated as plow 29, and as shown the tool frames 13 are interconnected by a cross beam 30. In the schematic views of Figs. 4 and 5 a single plow is illustrated, and for simplicity of explanation, the description of the invention will be directed to the single illustrated plow 29.

At the forward end of the tool frame 13 is mounted a skid element or ground engaging shoe 31. In normal operating position, shown in Fig. 1, skid 31 is positioned above the ground, extending downwardly and curving rearwardly with respect to frame 13. Skid 31 is formed with an upper flange 32 extending rearwardly and detachably fastened to frame 13 as clearly shown in Figs. 1 and 2. The fastening means can be a nut and bolt connection 33 or a pin and bolt arrangement 34, as shown in Fig. 2. A reinforcing member 35 is fastened at one end near the ground engaging end of skid 31. At the other end of member 35 is a yoke strap 40 which fits around the underside of tool frame 13.

Positioned forwardly of plow 29 and depending from tool frame 13 is a ground engaging or coulter wheel 36 of conventional construction. This construction includes a yoke portion 37 connected to a shank 38. It should be noted that shank 38 is connected to tool frame 13 by the same fastening 33 which connects skid 31 to the tool frame. A chain assembly 39 is also used to interconnect coulter 36 and tool frame 13.

Extending rearwardly and upwardly from tractor 11 is an upper releasable link 44. Mounted on the rear end of upper link 44 is a stop means 45 which includes an annular member 46 slidingly fitted on upper link 44 and a set screw 47 operable to fasten member 46 to upper link 44 in a selected position. The forward end of upper link 44 is connected to tractor 11 by pivot mounting 49 and includes telescoping sections 51 and 52, as illustrated in Fig. 3. Section 51 is formed so that its outside diameter can be threadedly engaged within section 52. Locking nut 53 will help maintain a selected length adjustment of upper link 44.

Mounted on upper releasable link 14 and adapted for sliding movement thereon is a sleeve and housing assembly 55. This assembly comprises a sleeve element 56 enclosing upper link 44 and having a housing portion 57 formed on the upper side of sleeve 56. Housing portion 57 projects upwardly from upper link 44 and includes a hollow center part 60 within which a slidable pin 58 is urged in a downward direction by compression spring 61 that is also fitted in hollow housing part 60.

As shown in Fig. 3 hollow part 60 extends through housing 57 and forms an opening 63 at the upper end of housing portion 57. Cap 64 forms the closure for opening 63 and is threadedly engaged within opening 63. Projections 66 on cap 64 can be used for adjusting the cap to maintain a compressive force on spring 61. An integral annular washer 67 is formed on cap 64, and is of sufficient diameter to contact the top of housing 57 when cap 64 is screwed down, thus determining the maximum compressive force than can be applied to spring 61.

It should be noted that pin 58 has a tapered portion 69 at its lower end. A complementary tapered notch or recessed portion 71 is formed near the rearward end of releasable link 44. As clearly shown in Fig. 3, pin 58 projects through sleeve and housing assembly 55 and under normal plowing conditions is biased by spring 61 so as to engage notch 71 to lock assembly 55 and upper link 44 together.

Sleeve assembly 55 is connected to tool frame 13 by frame link 73, being fastened at one end by nut and bolt 23 and at the other end by pivot mounting 74. An additional brace link 76 is fastened to the upper part of frame link 73 by bolt connection 75 and extends forwardly and downwardly to be fastened by bolt connection 77 to tool frame 13. As mentioned before, the present invention can be used with more than one tillage tool, and as shown in Figs. 1 and 2, the two-bottom plow has a rearwardly projecting brace link 78 connecting the rear point of tool frame 13 with frame link 73.

In operation, the tillage tool 29 may be adjusted to the desired operating depth by hydraulically lowering lift links 14 in a known manner. Stop means 45 is permanently fastened to the rearward end of upper link 44 to prevent assembly 55 from moving rearwardly from the locked position on upper link 44. This locked position is maintained by the engagement of tapered pin 58 with tapered notch 71. The tension of spring 61 on pin 58 is set by adjusting cap 64 so that under normal plowing conditions pin 58 will be maintained in engagement with notch 71. However, if an obstruction, such as a hidden rock 81 shown in Fig. 4, is encountered by plow 29, the increased draft will impart a rotating action to plow 29 and tool frame 13. This sudden application of a large rotative force will overcome the spring bias on pin 58, and since pin 58 has a tapered part 69, pin 58 will be cammed out of engagement with tapered notch 71. The rotative force on plow 69 will cause the plow to swing up around axle 17 while assembly 55 slides forwardly until it strikes stop nut 53, as shown by the dotted line position in Fig. 3. It should be pointed out that nut 53 has been previously adjusted to allow plow 29 to swing up sufficiently to be above ground level.

As plow 29 swings out of the ground, ground engaging shoe or skid 31 is rotated downwardly at the same time to contact the ground, as shown in Fig. 5. The engagement of skid 31 with the ground as the plow moves out of ground engagement affords a support for the swinging weight of the plow. Skid 31 is an important element in the present invention, for the usual plow assembly weighs hundreds of pounds, and swinging this large weight upwardly without a skid support might break the tool frame or plow linkage. However, the present invention is not to be limited to the combination comprising the skid support, as in another embodiment, which will be mentioned hereinafter, the invention can be utilized without a skid support.

After the plow 29 has been swung out of ground engagement, and after the tractor and plow assembly has moved past the obstruction, the tractor can be stopped, and the operator can swing the plow downwardly to the working level, at the same time causing pin 58 to engage notch 71 so that the tractor is ready to continue the plowing operation.

The present invention can be utilized with tillage tools other than plows. As illustrated in Fig. 6, the invention is embodied in a cultivator type or quack digger assembly 83. The draft transmitting elements 12 are suitably attached to the tractor 11 as shown in Fig. 1. Cultivator tool frame 84 is pivotally mounted on lower links 12 so that attached tools 86 can be swung out of the ground when an obstruction is encountered, as shown by the dotted line position in Fig. 6. The upper compression link 44 and assembly 55 are the same as shown in Fig. 1, and frame link 73 interconnects upper link 44 with lower link 12. It will be noticed in this embodiment that the skid element, fastened to the front part of the tool frame in Fig. 1, is not necessary. The weight of the cultivator tools 86 is much less than the weight of plow 29 so that the danger of equipment breakage as the tool frame shown in Fig. 6 swings upwardly does not exist. Accordingly, it is not usually necessary to counterbalance the upswinging weight of the cultivator 86 with a ground engaging skid.

The particular embodiments of the invention illustrated and described herein are illustrative only. The invention includes such other modifications and equivalents as may readily occur to those skilled in the art, within the scope of the appended claims.

What I claim is:

1. A safety device for permitting swinging of a tractor mounted tool out of the ground when an obstruction is encountered comprising a tool frame mounted for rotation about an intermediate point, a coulter wheel mounted near the forward end of said tool frame and normally in engagement with the ground when the tool is in use, a skid shoe mounted on said tool frame forwardly of and adjacent said coulter wheel, said skid shoe being positioned to be out of engagement with the ground during normal operation, and releasable means permitting rotation of said tool frame about said intermediate point when an obstruction is encountered, said coulter wheel being positioned to leave normal contact with the ground when such rotation of the tool frame occurs and said skid shoe being positioned to engage the ground to take over the support from said coulter wheel, the position of the coulter wheel being such that its axis of rotation is forwardly of said intermediate point of rotation of the tool frame when the coulter wheel is on the ground and rearwardly of said intermediate point of rotation when the coulter wheel is out of engagement with the ground and after the skid shoe has taken over the support.

2. A safety device for permitting swinging of a tractor mounted plow out of the ground upon encountering an obstruction comprising, a tool frame rotatable about a point intermediate its length, said tool frame having a ground tool mounted on the rearward end thereof; a coulter wheel mounted near the forward end of said tool frame and normally in engagement with the ground when the tool is in use, a skid shoe mounted on said tool frame forwardly of and adjacent said coulter wheel, said skid shoe being positioned to be out of engagement with the ground during normal operation, an elongated rod of fixed length located above said tool frame and having a rear end provided with a stop, having latching means adjacent said stop, and having a forward end adapted to be pivotally connected to a tractor; a sleeve mounted for slidable movement on said rod and having a depending ear located forwardly of said stop; releasable latching means on said sleeve which is releasable under abnormal stress cooperable with said latching means at the rear end of the rod to normally maintain the sleeve against sliding movement and against said stop at the rear end of the rod; and linkage projecting upwardly from said tool frame and pivotally connected at its upper end forwardly of said stop on the rod to the depending ear of said sleeve whereby when said ground tool encounters an abnormal obstruction said latching means is released so that said sleeve may slide forwardly away from said stop on said rod while the tool frame rotates in a direction to raise the ground tool, said tool frame linkage pivoting with respect to said sleeve and moving forwardly therewith while the rear end of the rod projects rearwardly beyond the connection between the tool frame and sleeve, said coulter wheel being positioned to leave normal contact with the ground when such rotation of the tool frame occurs and said skid shoe being positioned to engage the ground to take over the support from said coulter wheel, the position of the coulter wheel being such that its axis of rotation is forwardly of said intermediate point of rotation of the tool frame when the coulter wheel is on the ground, and rearwardly of said point of rotation when the coulter wheel is out of engagement with the ground and after the skid shoe has taken over support.

3. A safety device for permitting swinging of a tractor mounted tool out of the ground when an obstruction is encountered comprising a tool frame mounted for rotation about an intermediate pivot, a coulter wheel, means depending from said frame forwardly of said intermediate pivot for supporting said coulter wheel, a skid shoe mounted on said tool frame and depending therefrom forwardly of the support for the coulter wheel and being positioned to be out of engagement of the ground during normal operation, and releasable means permitting rotation of said tool frame about said intermediate pivot when an obstruction is encountered, said coulter wheel being positioned to leave normal contact with the ground when such rotation of the tool frame occurs, and said skid shoe being positioned to engage the ground to take over support from said coulter wheel, the position of the coulter wheel support being above the skid shoe when said skid shoe has taken over support whereby said support for the coulter wheel is protected against breakage by the skid shoe.

References Cited in the file of this patent

UNITED STATES PATENTS

| | | |
|---|---|---|
| 128,686 | Watson | July 2, 1872 |
| 1,504,373 | Paul | Aug. 12, 1924 |
| 1,628,372 | Strandlund | May 10, 1927 |
| 1,896,987 | Tranaas | Feb. 7, 1933 |
| 1,907,538 | Hanna | May 9, 1933 |
| 2,036,953 | Morris | Apr. 7, 1936 |
| 2,405,980 | Sands | Aug. 20, 1946 |
| 2,573,221 | Romig | Oct. 30, 1951 |
| 2,704,020 | Wilson | Mar. 15, 1955 |

FOREIGN PATENTS

| | | |
|---|---|---|
| 486,799 | Canada | Sept. 23, 1952 |